United States Patent [19]

Fan et al.

[11] 3,856,606

[45] Dec. 24, 1974

[54] COUPLING SOLID SUBSTRATES USING SILYL PEROXIDE COMPOUNDS

[75] Inventors: You Ling Fan, E. Brunswick; Richard Greggshaw, Califon, both of N.J.

[73] Assignee: Union Carbide Corporation, New York, N.Y.

[22] Filed: May 5, 1970

[21] Appl. No.: 34,897

Related U.S. Application Data

[63] Continuation-in-part of Ser. Nos. 737,319, June 17, 1968, abandoned, and Ser. No. 831,747, June 9, 1969, abandoned, which is a continuation-in-part of Ser. No. 737,315, June 17, 1968, abandoned, and Ser. No. 737,316, June 17, 1968, abandoned, and Ser. No. 737,317, June 17, 1968, abandoned, and Ser. No. 737,318, June 17, 1968, abandoned, and Ser. No. 737,321, June 17, 1968, abandoned.

[52] U.S. Cl.............. 156/329, 161/193, 161/206, 260/448.2 B, 260/448.8 A

[51] Int. Cl. .................... C09j 5/00, B32b 27/04
[58] Field of Search ............ 156/329; 161/188, 193, 161/206; 260/448.2 B, 448.8 A

[56] References Cited
UNITED STATES PATENTS

| | | | |
|---|---|---|---|
| 2,639,276 | 5/1953 | Smith-Johannsen et al. | 156/329 |
| 2,997,497 | 8/1961 | Jenkner | 260/448.8 |
| 3,746,611 | 7/1973 | Joy | 161/206 |

*Primary Examiner*—Douglas J. Drummond
*Assistant Examiner*—Robert A. Dawson
*Attorney, Agent, or Firm*—George A. Skoler

[57] ABSTRACT

This invention involves the adhesion of solid substrates through the use of silyl peroxide containing compounds; to methods for producing silyl peroxides by reacting certain amine-hydroperoxide adducts with silicon halides; and to novel peroxy silanes useful for effecting such adhesion.

1 Claim, No Drawings

COUPLING SOLID SUBSTRATES USING SILYL PEROXIDE COMPOUNDS

This application is a continuation-in-part of abandoned applications Ser. No. 737,319 filed June 17, 1968, and Ser. No. 831,747, filed June 9, 1969, the latter of which is a continuation-in-part of abandoned applications Ser. Nos. 737,315; 737,316; 737,317; 737,318; and 737,321; each of which was filed on June 17, 1968.

This invention relates to processes for making silicon peroxides, to novel silicon peroxides made by such processes and to uses thereof.

Silicon containing coupling agents have been employed for bonding organic polymers to inorganic substrates, yet it is believed by the art that such coupling agents do not function to improve bonding of organic polymers to organic substrates. Such coupling is dependent upon the formation of siloxane and some sort of interaction between the coupling agent, its hydrolyzate and/or condensate and the inorganic substrate. It appears to be fairly well recognized that the organo moieties on the silicon coupling agent should be designed for reaction with the organic polymer, such as a vinyl moiety for use with unsaturated polyesters, aminoalkyl moieties for reaction with phenol-formaldehyde or epoxy resins, and mercaptoalkyl for reaction with unsaturated elastomers of the synthetic rubber type. However, unless the coupling agent serves to react with the organic polymer by condensation reaction, viz., the reaction between carboxyl and amine to form carboxamide, it is typically necessary to provide a catalyst to effect reaction. However, in all cases, it is fairly well established that such prior art organosilicon coupling agents be capable of hydrolysis or condensation to siloxane or be in the form of a siloxane or siloxanol to effect any sort of coupling to the inorganic substrate. It is therefore a necessary prerequisite of these processes that the organosilicon be supplied to the substrate either as a hydrolyzate or be hydrolyzed on the substrate by virtue of the presence of water on the substrate surface or the availability of atmospheric moisture.

There is described herein bonding of organic polymers to not only inorganic substrates but also to organic substrates. Moreover, such can be accomplished without formation of siloxane prior to bonding of the organic polymer to the substrate. Most importantly, there is described herein the use of silyl peroxides which act universally in bonding organic polymers to essentially any substrate, principally because of the kind of dual functionality inherent in the silyl peroxide. This is particularly demonstrated by the ability of such peroxides to bond organic as well as inorganic substrates to organic polymers.

In addition, the silyl peroxides per se of this invention serve to do the unique job of bonding inorganic substrates with inorganic substrates, a feat not commonly believed to be within the capabilities of the conventional organosilicon coupling agents.

The silicon peroxides of this invention used to effect the desired coupling are those characterized by the formula:

I  $\quad R''_n Si_x(O)_y(R')_z R_a^{40}{}''$ wherein $R''$ is a monovalent inorganic or organic radical; $R'$ is a mono- or polyperoxy radical, such as ROO— and —OOR'OO—, where R is hydrogen or a monovalent organic radical bonded to the peroxy oxygen by a non-carbonyl carbon atom, such as alkyl, aralkyl, cycloalkyl, aryl, cycloalkyl and the like; $R'$ is a divalent organic radical of a dihydroperoxide of such divalent organic radical; $R'''$ is a non-peroxy containing divalent organic radical; $n$ is 0 through 3 multiplied by $x$; $x$ is 1 to a large number; $y$ is 0 or equal to the equation $x(4-n-z-a)$; $z$ is at least 1 and $a$ is 0 or equal to the equation $x(4-n-z-a)$. Preferably, $x$ is a number typically not greater than 25, more preferably, it is a number not greater than 5, and most preferably, it is equal to 1.

Illustrative of $R''$ are any monovalent inorganic radicals such as hydrogen, hydroxyl, alkali metal oxide (such as NaO, KO, LiO), amino, and the like, and any organic radicals such as alkyl (e.g., methyl, ethyl, pentyl, dodecyl, octadecyl, 2-ethylhexyl, and the like), cycloalkyl (such as cyclobutyl, cyclohexyl, 4-methylcyclohexyl, and the like), aryl (such as phenyl, 2-naphthyl, 2-anthracyl, biphenyl, and the like), alkaryl (such as 4-methylphenyl, 2,4-diethylphenyl, 4-dodecylphenyl, and the like), aralkyl (such as phenylethyl), alkenyl (such as vinyl, allyl, 3-butenyl, oleyl, and the like), alkadienyl (such as 1-butadienyl-1,4-, 1-octadecatrienyl-9, 11, 13-, 1-neoprenyl, and the like), cycloalkenyl (such as 3-cyclohexenyl), haloalkyl (such as chloromethyl, gamma-chloropropyl, 3,3,3-trifluoropropyl, perfluoropropyl), haloaryl (such as 4-chlorophenyl 2,4-dichlorophenyl, chloronaphthyl), halocycloalkyl (such as 4-chlorocyclohexyl), alkoxy (such as methoxy, ethoxy, propoxy, dodecyloxy, isopropoxy, and the like), aryloxy (such as phenoxy, napthyloxy, biphenyloxy, and the like), alkylamino and arylamino (such as methylamino, diethylamino, phenylamino, and the like), and any organofunctional radical such as hydroxyalkoxy (such as beta-hydroxyethoxy, gamma-hydroxypropoxy, and the like); hydroxyalkoxyalkoxy (such as beta-hydroxyethoxyethoxy, omega-hydroxy(polyethyleneoxy)ethoxy, omega-hydroxy-(poly-1,2,-propyleneoxy), and the like); cyanoalkoxy (such as beta-cyanoethoxy, beta-cyanohexoxy, and the like); cyanoalkoxyalkoxy (such as beta-cyanoethoxyethoxy, omega-cyanoethoxy-(polyethyleneoxy), omega-cyanoethoxy(poly-1,2-propyleneoxy), and the like); carboxyalkoxy (such as beta-carboxyethoxy, beta-carboxyhexoxy, and the like); haloalkoxy (such as chloromethoxy, bromoethoxy, perfluoropropoxy, and the like); cyanoalkyl (such as beta-cyanoethyl, gamma-cyanopropyl, and the like); cyanoaryl (such as 4-cyanophenyl); cyanocycloalkyl (such as 4-cyanocyclohexyl, 3-cyanocyclopentyl, and the like); carboxyalkyl (such as beta-carboxyethyl, gamma-carboxypropyl, and the like); carboxyaryl (such as 4-carboxyphenyl); carboxycycloalkyl (such as 4-carboxycyclohexyl, 3-carboxycyclopentyl; and the like); isocyanatoalkyl (such as gamma-isocyanatopropyl, delta-isocyanatobutyl, and the like); isocyanatoaryl (such as 4-isocyanatophenyl); isocyanatocycloalkyl (such as 4-isocyanatocyclohexyl); alkyl or aryl carboxyalkyl (such as beta-methylcarboxyethyl, gamma-phenyl carboxy propyl, and the like); hydroxyalkyl (such as hydroxymethyl, gamma-hydroxypropyl, and the like); hydroxy(polyalkyleneoxy)alkyl (such as omega-hydroxy(polyethyleneoxy)propyl, and the like; alkenylcarbonyloxyalkyl (such as gamma-acrylyoxypropyl, gamma-methacryloxypropyl, and the like); epoxyalkyl (such as 1,2-epoxyethyl, 1,2-epoxypropyl, 1,2-epoxybutyl, and the like); epoxy alkyloxyalkyl (such as glycidyloxypropyl); epoxycycloalkyl (such as beta-3,4-epoxy-cyclohexylethyl); aminoaryl and aminoalkyl (such as beta-aminoethyl-gamma-aminopropyl, aminomethyl, gamma-aminopropyl, delta-aminobutyl, p-aminophenyl); and the like.

Illustrative of R''' is any divalent organic radical which is joined to silicon at each free valence, such as alkylene (such as methylene, ethylene, n-hexylene, 2-ethyl-n-hexylene, and the like); arylene (such as 1,4-phenylene, 1,3-phenylene, 1,5-naphthylene, and the like), cycloalkylene (such as 1,4-cyclohexylene, 1,3-cyclohexylene, 1,3-cyclobutylene, and the like), and such divalent organic radicals as $-(CH_2)_3COO(CH_2)_3-$, $-(CH_2)_3CONH(CH_2)_3-$, $-(CH_2)_3NHCONH(CH_2)_3-$, $-(CH_2)_3O(CH_2)_3-$, $-OCH_2CH_2O-$, $-O(CH_2CH_2O)_{10}-$, and the like.

R' may be characterized as the residue of the hydroperoxides having the formulas ROOH
and
HOOR'OOH obtained by the abstraction of hydrogen from the peroxy oxygen. Illustrative of such hydroperoxides are the following: hydrogen peroxide; methyl hydroperoxide; ethyl hydroperoxide; propyl hydroperoxide; isopropyl hydroperoxide; n-butyl hydroperoxide, sec-butyl hydroperoxide, t-butyl hydroperoxide; t-amyl hydroperoxide; 1,1-diethylpropyl hydroperoxide; 1,1,2-trimethylpropyl hydroperoxide; 1-methylhexyl hydroperoxide; 1,1,2,2-tetramethylpropyl hydroperoxide; cyclohexyl hydroperoxide; 4-methylcyclohexyl hydroperoxide; trans-decalin hydroperoxide (trans-decahydro-4α-naphthyl hydroperoxide); hexahydro-3α-indanyl hydroperoxide; 2,5-dihydroperoxy-2,5-dimethylhexane (2,5-dimethylhexylidene 2,5-hydroperoxide); 2,7-dihydroperoxy-2,7-dimethyloctane (2,7-dimethyloctylidene 2,7-hydroperoxide); 2-hydroperoxy-2,4-dimethyl-3-pentanone; 1,1,6,6-tetrahydroperoxycyclodecane; 2-cyclopenten-1-yl hydroperoxide; 2-cyclohexen-1-yl hydroperoxide; 2-methyl-2-cyclohexen-1-yl hydroperoxide; 2,3-dimethyl-2-cyclohexen-1-yl hydroperoxide; d,-1-3-p-menthenyl-8-hydroperoxide; 3-methyl-3-hydroperoxy-1-butyne-(1,1-dimethyl-2-propynyl hydroperoxide); 2,5-dimethyl-2,5-dihydroperoxy-3-hexyne (1,1,4,4-tetramethyl-2-butynylenedihydroperoxide; α-methylbenzyl hydroperoxide; cumene hydroperoxide (α, α-dimethylbenzyl hydroperoxide); α-methyl-α-ethyl-benzyl hydroperoxide; α-p-xylyl hydroperoxide; diphenylmethyl hydroperoxide; triphenylmethyl hydroperoxide; tetralin hydroperoxide; (1,2,3,4-tetrahydro-1-naphthyl hydroperoxide); 1,2,3,4-tetrahydro-1-methyl-1-naphthyl hydroperoxide; 9-fluorenyl hydroperoxide; 1-indanyl hydroperoxide; tetrahydro-2-furfuryl hydroperoxide; and tetrahydrocarbazole hydroperoxide (1,2,3,4-tetrahydro-4αH-isocarbazol-4α-yl hydroperoxide) and 2,3-dimethyl-3-hydroperoxy butene-1.

As can be seen from the above description of the silyl peroxide compounds of this invention, they may be in the form of a monomer or polymer, e.g., silane, siloxane, or silicane, in fact any silicon-containing compound which contains an organoperoxy group bonded to silicon, which organo moiety is bonded to the peroxy oxygens and thence to the silicon by a non-carbonyl carbon atom.

Important embodiments of this invention are novel methods for making silicon peroxides and novel silicon peroxides obtainable thereby and useful in effecting bonding as described.

These processes involve forming an immiscible mixture of an isolated pre-formed adduct of triethylenediamine or hexamethylene tetraamine and a hydroperoxide with a silicon halide dissolved in a solvent therefore but not for the adduct, then separating the insoluble triethylenediamine hydrohalide salt or the insoluble hexamethylene tetraamine hydrohalide salt formed therein to obtain a solution of the silicon peroxide, provided that when hexamethylene tetraamine is employed, there is provided in the mixture a metal complexing agent and it is separated from the mixture after formation of the hexamethylene tetraamine hydrohalide salt.

In the following discussions, the aforementioned adducts of either triethylenediamine or hexamethylene tetraamine and a hydroperoxide will be referred to, collectively, as amine or hydroperoxide adducts.

The prior processes for the production of silyl peroxides involve, for example, a straight reaction between a halo silane and the hydroperoxide. This straight reaction results in extremely small yields indicating a highly inefficient reaction. The art has defined the use of a number of catalysts which are used in stoichiometric portions and enter into the byproduct formation. These aid the reaction and improve the yields over those obtainable in the straight reaction. Normally, these catalysts are amine bases and their reaction involves formation of amino hydrohalide by-products which are in solution and/or thorough admixture with the resulting peroxy silane. In order to separate the peroxy silane, recourse is needed to distillation or crystallization procedures. Other methods involve the reaction of silylamines with hydroperoxides. The yields from this process are extremely low and the process involves expensive procedures to separate the amino-hydrohalide by-product from the silyl peroxide. In general, the procedures of the prior art are inefficient, providing low yields, and are susceptible to violent explosions and substantial impurity formation. The processes of this invention minimizes these problems. The processes of this invention achieve yields significantly superior to prior art processes, usually above about 50 weight percent to 100 weight percent, based upon the weight of hydroperoxide employed.

The usable silicon halides in these processes, broadly speaking, encompasses any solvent soluble silicon containing compound which possesses halogen bonded directly to the silicon atom. The silicon compound may contain a plurality of halogen bonded to silicon and/or a plurality of silicon atoms, each of which possesses halogen. Generally speaking, it is desirable that the silicon halide possess a molecular weight not in excess of about 50,000, preferably less than 20,000, and most preferably it is a silicon compound which contains not more than 5 silicon atoms therein. The remaining valences of the silicon atom, that is, those valences which are not taken up by halogen, may be bonded to any group, organic or inorganic. Illustrative silicon halides are those encompassed by the following general formula:

II    $R''_n Si_x(O)_y X_z R_a'''$ $R'''$, $n$, $x$, $y$, $z$ and $a$ are described above; and X is halogen such as chlorine, bromine and fluorine.

The varieties of silicon halides usable in the practice of this invention are great, as illustrated above, and the only requirement thereof is that they contain halogen bonded directly to silicon. The term "silicon halide", as employed herein, encompasses silanes, siloxanes, silicanes, and the like.

The hydroperoxides employable in these processes are illustrated above.

Usable solvents in the practice of this invention are those in which the silicon halide is soluble and the resulting amine hydrohalide byproduct is not soluble. Also it is desirable that the adduct of the hydroperoxide be insoluble in the solvent. The solvent should be one which does not interfere with the reaction. Therefore, it is typically desirable not to employ a highly polar solvent. The process of this invention works admirably with solvents such as liquid hydrocarbons, e.g., mineral spirits, n-hexane, 2-ethyl-n-hexane, n-heptane, n-octane, n-dodecane, toluene, xylene, benzene, mixed hydrocarbon fractions, and the like. Marginally, polar solvents well known to those in the art can be employed, though they are not preferred over the aforementioned hydrocarbons. It is believed that an extremely polar solvent will, to some degree, interfere with the reaction to adversely affect the yields obtained. However, this does not mean that such polar solvent cannot be employed in the practice of this invention to the extent that they do not adversely effect the yield of product. Thus, to some extent, one may employ ketones, amides, sulfoxides, esters, aldehydes, and the like polar solvents.

It is desirable to effect good mixing between the reactants so as to insure complete reaction, but this is not a critical feature. To some extent it may affect the yield or rate of reaction.

The temperature at which this reaction is effected may range from a temperature below 0°C. at which the silicon halide has at least some solubility in the solvent employed to a temperature above 0°C. at which the hydroperoxide amine adduct exhibits instability, that is, starts to decompose at a relatively fast rate. By relatively fast rate, that means a temperature at which the decomposition runs at a rate faster than the reaction between the silicon halide and the hydroperoxide. Preferably, the temperature employed is in the range of from about −80°C. to about 100°C., most preferably −20°C. to 60°C. Usually, the reaction is carried out in a comfortable temperature range of about 0°C. to about room temperature, that is, 25°C.

Because the reaction mixture is a heterogeneous mixture, some mixing between the reactants employed is desirable. However, when the amine hydroperoxide adduct is made into a fixed bed, then simple flowing of the silicon halide solution through the bed will usually be sufficient to effect the desired reaction.

The process of this invention involves an exothermic reaction and therefore it is desirable to maintain the temperature of the reaction at the levels at which most favorable results are achieved. This is within the skill of the experimenter in the manufacture of a given silyl peroxide and heat withdrawal methods such as conduction, radiant, or convection cooling may be employed in order to effect a measure of control over the process.

Other than this factor, as well as those previously described, the process operates with considerable ease and facility.

In the case with the use of the hexamethylene tetraamine adduct with the hydroperoxide, it is complexed (or is believed to be complexed) with a polyvalent metal salt of an acid preferably an acid having a pH lower than 5. The polyvalent metals, when incorporated with hexamethylene tetraamine in the formation of its adduct with the hydroperoxide, have been found to enhance significantly the yield of silyl peroxide. In the absence of such polyvalent metal salts, the yields obtainable typically do not exceed 50 percent, based upon the weight of hydroperoxide employed, whereas when the polyvalent metal salt is employed in the formation of the adduct and kept present during the formation of the silyl peroxide, the yields obtained of silyl peroxide, in almost all cases, exceed 50 percent, based upon the weight of hydroperoxide employed.

The polyvalent metals employable in the practice of this invention are those of Group IIA of the Periodic Chart having atomic numbers from 12 through 56, and Groups IB and IIB having atomic numbers from 29 to 48. The Periodic chart employed herein can be found at pages 58 & 59 of Lange's Handbook of Chemistry, 6th Edition, 1946, published by Handbook Publishers, Inc., Sandusky, O.

The anion of the polyvalent metal salt is desirably derived from a strong acid such as acetic, trichloroacetic, sulfuric, hydrochloric and the like acids. Illustrative metals include, by way of example, magnesium, calcium, strontium, barium, copper, zinc, silver, cadium, and the like.

The mole amount of metal salt employed is desirably at least equal to the mole amount of hexamethylene tetraamine used in forming the adduct. Usually,, a 10 to 50 mole percent excess of the metal salt is employed in the process.

It is usual to expect a yield which typically exceeds those experienced by the prior art methods employing comparable starting materials and this result is a by-product of the fact that the peroxide-amine adduct is in an immiscible state vis-a-vis the silicon halide reactant. The process has admirable and most advantageous qualities in that the amine hydrohalide by-product is readily separated from the silicon peroxide product by simply precipitating or filtering it from the solution of silicon peroxide product. Centrifuging of the amine hydrohalide salt may also be employed to insure maximum separation of the two.

The adducts of the hydroperoxide and these amines can be effected by simple admixture of the two reactants. These hydroperoxy amine adducts can be made in a variety of ways. A most suitable method is described in U.S. Pat. No. 3,236,850, patented Feb. 22, 1966.

These processes can be used to produce a number of useful and novel peroxy silanes described hereinafter.

There are described two embodiments of novel peroxy silanes, one which contains hydrolyzable organooxy groups attached to Si and the other which contains solely hydrogen or certain organofunctional radicals and peroxy radicals attached to Si.

The first category of novel peroxysilane described are those characterized by the formula III    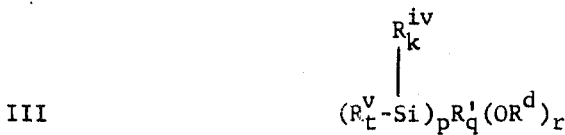

wherein $R^{iv}$ is alkyl of 1 to 5 carbon atoms (such as methyl, ethyl and amyl) and phenyl; $R^v$ is hydrogen; alkyl having from about 1 to 5 carbon atoms (such as methyl, ethyl and amyl); vinyl; allyl; isocyanatoalkyl of 3 to 6 carbon atoms in the alkyl group, at least 3 of which are in sequential order separating the isocyanato moiety from the Si; glycidyloxypropyl; beta-(3,4-epoxycyclohexyl)ethyl; gamma-mercaptopropyl; beta-mercaptoethyl; and gamma-methacryloxypropyl; $R'$ is described above; $R^d$ is alkyl of 1 to about 8 carbon atoms, phenyl or acyl (such as acetyl, propionyl, and the like); $p$ is equal to the free valence of $R'$; $q$ is 1 or 2; $k$ is 0 or 1; $r$ is at least 1 and is less than $p(r-q-k-t)$; $t$ is 1 or 2; and the sum of $t$, $k$, $q$ and $r$ does not exceed the value of $4 \times p$.

The silyl peroxides of Formula III are obtainable by the above process by the reaction of halosilanes of the formula:

IV 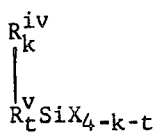

wherein X is a halogen such as chlorine, fluorine and bromine, with the aforementioned amine adducts and an alkali metal salt of the formula $ZOR^d$, wherein Z is an alkali metal, such as sodium, lithium and/or potassium.

The process employed involves adding to a solvent solution of the silane of Formula IV a mixture of the alkali metal salt of an alkanol and/or phenol and/or a carboxylic acid with the aforementioned hydroperoxide-amine adduct. The mixture typically contains a proportion of each component corresponding to the amount of substitution preferred on the silane. For example, if a vinyl or allyl trihalo silane is desired to be converted to vinyl methoxydiperoxy silane, then the ratio of a monohydroperoxide-amine adduct to the alkali metal salt of methanol would be 2:1, basis equivalent ratio of peroxy group to hydroxy group. Usually the product of the reaction is a mixture of products varying in $R^dO$—content and peroxy content, and by simple distillation, it is possible to separate each such product from the others to obtain the desired and intended reaction product.

Illustrative of $ZOR^d$ are the alkali metal alkoxides, phenates, and acylates such as, sodium methoxide, lithium ethoxide, potassium n-propoxide, sodium phenate, sodium-4-methylphenate, potassium (beta-methoxy)ethoxide, sodium (beta-ethoxy)ethoxide, sodium acetate, lithium acetate, potassium acetate, sodium formate, lithium propionate, sodium benzoate and the like. preferably, $R^d$, when aliphatic contains typically not more than about 8 carbon atoms, and when aromatic, it is monocyclic and contains typically not more than about 14 carbon atoms.

Since the peroxide radicals of the silanes of formula III are relatively stable towards hydrolysis and condensation under mild conditions of acidity or alkalinity, it is possible to hydrolyze the organooxy moieties of the silicone compound i.e., $R^dO$, to form siloxanes containing reoccurring siloxy and peroxy groups. Thus, there are obtainable by straight forward hydrolysis and condensation products having the formula:

V 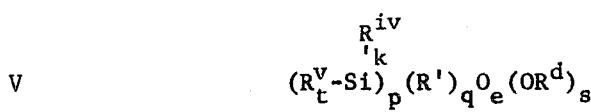

wherein $R^v$, $R'$, $R^d$, $R^{iv}$, and $p$, $t$, $k$, and $q$ are described above, $e$ is equal to the equation of $p(4-q-t-k)/2$ and $s$ is equal to the equation $p(4-q-2.e-t-k)$.

Hydrolysis is accomplished by mixing the silicon compound of Formula III in water at a pH typically not lower than 5 and not greater than 9, preferably not less than 5.5. and not greater than 8.5. Condensation is effected by heating the hydrolyzate at a temperature below the peroxide decomposition temperature for a sufficient period of time to effect removal of $OR^d$ groups. This may be accomplished by coating the hydrolyzate on a substrate and heating the coated substrate at a temperature sufficient to evaporate water from the surface. It is preferred that hydrolysis be conducted at a pH as close to 7 as possible, such as about 6.5 to 7.5.

The second embodiment or category of novel peroxy silane described are those characterized by the formula:

VI 

wherein $R^a$ is hydrogen, isocyanatoalkyl of 3 to 6 carbon atoms in the alkyl group, at least 3 of which are in sequential order separating the isocyanato moiety from the Si; glycidyloxypropyl; beta-(3,4-epoxycyclohexyl)ethyl; gamma-mercaptopropyl; and gamma-methacryloxypropyl; $R'$ is described above; $R^b$ is hydrogen, alkyl to 1 to 5 carbon atoms (as defined above), or phenyl; $g$ is 1, 2 or 3; $h$ is equal to $f(4-g-i)$; $i$ is 0, 1 or 2; and $f$ is equal to the free valence of $R'$.

These silanes are produced by the aforementioned amine adduct process by reaction of the amine adduct with halosilanes of the formula VII 

wherein $R^a$, $R^b$, $g$, $i$ and X are defined above.

Enhanced bonding is achievable utilizing any of the silyl peroxides described on any inorganic or organic material which forms a solid surface in use, without any reservation. All that is required is that there is intimate and direct contact between the surfaces and the presence of the silyl peroxide at at least one of the surfaces with sufficient heat to cause decomposition of the silyl peroxide. Either the surface interface contains the silyl peroxide or either one or both of the materials providing the surface contains the silyl peroxide. This is not to say that any one of the silyl peroxides can be arbitrarily selected to obtain optimum bonding between any organic polymer and any substrate. However, silyl peroxides will effect to some degree some improvement in bonding between the surfaces when compared with bonding achievable absent such silyl peroxides. Superior bonding by proper selection of the silyl peroxide is obtainable.

Illustrative of inorganic and organic substrates within the purview of this invention are, by way of example, metal substrates, such as aluminum, iron, copper, steel (stainless steel, carbon steel, and the like), magnesium titanium, zirconium, nickel, stainless steel alloys, chromium steel alloys, chromium plate, copper, zinc, bronze, brass, gold, platinum, silver, iridium, and the like; metal oxide substrates, such as aluminum oxide, titanium oxides, lead oxides, copper oxides, iron oxides, beryllium oxides, manganese oxides, tungsten oxides, tantalum oxides, vanadium oxides, and the like; non-metal inorganic oxides, such as silicon oxides (e.g., sand, fly ash, hydrated silica, silica, quartz, aerogels, xerogels, fumed silica, and the like); aluminum silicates (such as clay, asbestos, and the like); glass, in essentially any form, (e.g., fiber, plate, granular, spheres, and the like), other inorganic solid salts, such as calcium carbonate, magnesium carbonate, magnesium sulfate, lead chromate, iron chromates; as well as carbonaceous inorganic materials, such as graphite in essentially any form, carbon black; boron nitride; polyaminoboranes; polyphosphinoaminoboranes; and the like.

The solid organic substrates may be of any solid, natural or synthetic organic material, such as cellulosics, e.g., wood (in any shape, e.g., as wood flour, paper, boards, composites, and the like); cotton, rayon, cellulose acetate, cellulose triacetate, nitrocellulose, and the like, in any form, e.g., particulate, film or fiber; polyamides, such as wool, silk, zein, horse hair, hog's hair, human hair, leather, poly(hexamethyleneadipamide), poly-epsilon-caprolactam, polypyrrolidone; polyesters such as saturated and unsaturated polyester, e.g., alkyd resins, polymerized linseed oil, oxidized linseed oil and other drying oils, bodied natural oils which are triglycerides of fatty acids, polyethyleneterephthalate, polycyclohexyleneterephthalate, poly-epsilon-caprolactone and the like; organic rubbers, such as natural rubber, synthetic rubbers, such as 1,3-butadiene styrene copolymers, polysulfide rubbers, ethylacrylate polymers, poly-1,3-butadiene, poly-1-butene, polyurethane spandex polymers such as a polyester of adipic acid and 1,4-butane diol which is terminated by reaction with bis(4-isocyanatophenyl)methane and this isocyanato prepolymer is chain extended with 1,4-butane diol, or a polyester of poly-epsilon-caprolactone initiated by reaction with diethylene glycol optionally followed by reaction with toluene isocyanate (i.e., mixed isomers of the 2,4- and 2,6- varieties), which prepolymer is capped by reaction with bis(4-isocyanatophenyl) methane and this prepolymer is chain extended with ethylene diamine, or the same type of spandex polymer except that for the caprolactone polyester there is employed a polyether diol, such as poly(oxytetramethylene)glycol and in such cases the same extension may be effected with hydrazine instead of ethylene diamine; copolymers of ethylene and/or propylene and a polyolefin such as, e.g., 1,3-butadine, 2-ethylidenenorbornene-5(or 6) and the like; silicone rubbers, such as poly(dimethylsilyloxy) (commonly referred to as dimethylpolysiloxane), copolymers of such siloxane containing vinylsilyl groups and the like; polyolefin resins, such as homopolymers and copolymers of ethylene, propylene, 1-butylene, vinylacetate, vinyl formate, vinyl propionate, vinyl chloride, N-vinyl pyrrolidone, acrylonitrile, styrene, butadiene-1,3, maleic acid, fumaric acid, acrylic acid, methacrylic acid, crotonic acid, alkyl and aryl esters of the aforementioned acids, tetrafluoroethylene, trichlorofluoroethylene, vinyl silanes, and the like; polyaryl ethers and polyarylsulfones and copolymers of the two; silicone resins, epoxy resins such as the cycloaliphatic epoxides or the aromatic epoxides, the latter typically being based on the glycidyl ethers of bisPhenol A; phenol-formaldehyde resins, melamine-formaldehyde resins; urea-formaldehyde resins; polycarbonates based on the bisPhenol A carbonates or the aliphatic polycarbonates; and the like. Essentially any organic and inorganic materials may be bonded to each other or themselves utilizing the silyl peroxide of this invention.

A notable utilization of the silyl peroxides involves the adhesion of unsaturated polyester resins to surfaces upon which it is coated or which are incorporated in the polyester resin as a component thereof. Unsaturated polyester resins are well known commercial materials used for coating and molding or casting reinforced structures. They are employed for coating a number of substrates, such as wood, paper, metal, glass, glass fibers and fabrics of glass fibers, and the like, or used as an adhesive to interbond such kinds of substrates. Molded or casted articles are made from such resins and the most desirable of such molded or casted resin articles contain fiber glass or fiber glass fabrics for reinforcement of the resin.

Such unsaturated polyester resins and their applications have been thoroughly described in the published literature, such as by J. R. Lawrence, in a book entitled "Polyester Resins", 1960, Reinhold Publishing Corporation, New York, N.Y. All of the unsaturated polyester resins are either liquid or are employed as liquids by dissolving them in solvents. They are all curable and in all cases can be cured by free radical generating sources such as by free radical catalysts. Generally, when they are reinforced with reinforcing materials such as fiber glass or are employed as coating resins on a substrate, the reinforcing materials and the substrate are treated prior to association with the unsaturated polyester resin with materials which enhance the adhesion of the resins to such materials and substrates. For example, fiber glass fabrics and fillers are treated with adhesion promoters such as vinyl tris (methoxyethoxy)silane, sodium vinyl silanolate, gamma-methacryloxypropyltrimethoxysilane, and methacrylatochromium chlorides, and the like materials, which apparently serve to chemically bond the resin to the surface of the reinforcing materials and thereby enhance the reinforcement of the resin. Such adhesion promoters are also employed when the surface to be covered is an inorganic oxide other than glass fiber. In other cases, such surfaces are frequently primed with a resinous coating to enhance bonding of the polyester resin to the substrate. For example, epoxy resin primers are frequently used on metals to enhance bonding of polyester resins.

Significant advantages accrue when silyl peroxides are incorporated in polyester resins. In one instance, the silyl peroxides can be employed to replace the usual adhesion promoters or primers heretofore employed to increase the adhesion of the polyester resin to the substrate. In addition, the silyl peroxides can be employed as a free radical generating source to effect cure and crosslinking of the polyester resin while simultaneously acting to provide excellent adhesion of the unsaturated polyester resin to the substrate which may be either the surface upon which the polyester resin is coated or the reinforcing material incorporated in the polyester resin.

As pointed out previously, the silyl peroxides are most unique in effecting adhesion promotion simply because they are not restricted to improving bonding to select surfaces but, rather, can be employed to effect bonding between any solid surfaces. Hence, in the case with polyester resins, the silyl peroxides also possess the same non-selectivity for adhesion promotion and hence can be employed to improve bonding of unsaturated polyester resins to essentially any substrate or reinforcing material.

Typical unsaturated polyester resins have been described above. However, significantly employed commercial polyester resins are those which are the reaction product of such materials as ethylene glycol and maleic or fumaric acids or their anhydrides. Also incorporated in the polyester structure are the saturated dicarboxylic acids such as phthalic acid or anhydride which when reacted with glycol and the unsaturated dicarboxylic acid becomes an integral component of the polyester structure. These polyester resins are dissolved in a reactive solvent such as styrene, alpha-chloromethylstyrene, alpha-methylstyrene, vinyl toluene, and the like materials. Such reactive solvents act to reduce the viscosity of the polyester resin and react with the polyester resin during the curing and crosslinking reaction.

In the practice of this invention, the silyl peroxide alone may be employed to effect crosslinking of the unsaturated polyester resin or they may be combined with conventional peroxides such as benzoyl peroxide, lauryl peroxide, di-teriarybutyl peroxide, and the like peroxide catalysts. In addition, the reaction can be initiated when the silyl peroxide is present in the polyester resin not only be heat but also by photocatalysis such as by irradiating the polyester resin with light, gamma-rays, x-rays, electron beams and any other energy source which serves the function of causing decomposition of the silyl peroxide.

It has become evident from the foregoing discussion, that this invention also encompasses the utilization of the silyl peroxide in what can be regarded as reactive solvent resin systems. They comprise a resin such as the unsaturated polyester and a solvent for the resin such as styrene which serves the function of entering into reaction with the polyester to form the resultant solid crosslinked polyester article. In addition, the invention also encompasses the utilization of monomers containing ethylenic or acetylenic unsaturation such as styrene, methyl methacrylate, and the various other olefinically unsaturated monomers mentioned previously with respect to the composition of useable polymers, in combination with the silyl peroxide on a solid substrate and causing the polymerization thereof in situ on such surface. By causing the decomposition of the silyl peroxide, a free radical generating source is provided which causes the addition polymerization of such unsaturated monomers. They are in turn tightly bonded to the surface of the substrate and form a polymer made of mers of such unsaturated monomers.

Bonding may be effected in a number of ways. For example, the silyl peroxide can be incorporated into a liquid version of the material which is to result in the formation of a solid surface which adheres to another solid surface or which can be coated on either one or both of the surfaces being joined. One may bond glass to glass with just the silyl peroxide or aluminum to aluminum with just the silyl peroxide or aluminum to essentially any organic resin or polymers with just the silyl peroxide or any organic material to any other organic material with just the silyl peroxide, provided in each case there is sufficient intimate contact between the surfaces. In every case, the silyl peroxide will act to enhance adhesion when compared to such attempts to adhere absent a bonding aid and simply involving common contact between the materials. Of course, thermosetting or thermoplastic materials can be joined, provided they are compatible, with heat alone, absent the silyl peroxide. But it must be remembered that when such materials are so joined they must typically be in a common plastic state to obtain optimum adhesion, whereas when one employs the silyl peroxide of this invention in either one of the materials, it is not necessary to employ temperatures which will liquify the material, interfacial softening is all that is needed. Thus, one may take two incompatible thermosetting plastics, and provided one makes intimate contact between them and silyl peroxide is provided at the interface, then enhanced bonding or adhesion of the two articles will result.

The degree of enhanced bonding is dependent upon the particular silyl peroxide selected. There may be instances where certain silyl peroxides do not create adhesion advantages simply because they represent a ludicrous selection, for example, the selection of a high polymeric siloxane bearing the silyl peroxide units, vis., $x$ is 25, $n$ is 0 and $a$ is 0 of the silyl peroxide defined by Formula I, and this material is applied on the surface of an extremely low melting material which is decomposed below the temperature of decomposition of the silyl peroxide. In other words, it is the recommendation of this invention that the selection of silyl peroxide bear some reasonable similarity to good chemical practice and not be an arbitrary one. Even in such cases, as just described, there are ways in which one might obtain from such a silyl peroxide structure desirable results even with extremely low melting materials. This would involve the blending of the silicon material into the low melting material prior to shaping the mixture into an article or bonding the mixture to another surface. Moreover, the peroxy silicon compound should be one which has a relatively low decomposition temperature comparable with the melting point or below the melting point of the material so that the material is not heated to a temperature which causes adverse decomposition thereof in order to decompose the peroxy silicon compound.

The silyl peroxide can be dissolved in a solvent, or dispersed in a liquid and incorporated into a medium of the organic or inorganic material which forms the desired surface or it can be coated with or without a solvent depending upon its physical condition on a substrate bearing the adherent surface.

The silyl peroxides possess remarkable stability vis-a-vis other peroxides. Though the silyl peroxide is made by reaction with a hydroperoxide, it usually has a higher temperature of decomposition than the corresponding hydroperoxide or even a peroxide bearing the organic radicals of such hydroperoxide. For example, a cumyl hydroperoxy silicon compound is typically more heat stable than dicumyl peroxide, and therefore, the silicon peroxides of this invention, as employed in accordance with this invention, are capable of utilization under conditions which would adversely affect wholly organic peroxides. Of course it is to be recognized that these wholly organic peroxides do not enhance bonding as described herein.

It is believed that the residue formed by the reaction of the silyl peroxide (called the "derivative" of the silyl peroxide herein) forms in part at the interface of the surfaces being joined and in some manner contributes to bonding. Though there is no direct proof of this, this assumption is reasonable on the basis of the enhanced bonding obtained from the use only of the sily peroxide. It is the supposition on which it is claimed that the silyl peroxide, its residue (or derivative) is at the interface of the surfaces.

If the silyl peroxides are dissolved in solvent, the solvent selected is dependent upon the silyl peroxide employed. Usually hydrocarbon solvents such as mineral spirits, toluene, xylene, n-nonane, n-hexane and the like are employable. In some cases the silyl peroxide may be solid at the temperature of employment and can be particularized and therefore incorporated in one of the materials forming a substrate by conventional techniques normally employed for blending solid particles in resins, rubbers and other masticable materials.

In addition, liquid silyl peroxides can be emulsified in water using conventional surfactants to maintain them in suspension. The nonionic surfactants appear most favorable for this use.

There is described hereafter a plurality of examples for the purpose of illustrating this invention and not limiting it. A number of useful techniques for using the silyl peroxides are described as well as some additional methods for preparing special ones.

EXAMPLE 1

Into an Erlermeyer flask are placed 11.2 grams (0.1 gram/mole) of triethylene diamine and 40 milliliters of benzene. The solution is cooled in an ice-water bath to about 10°C., and 18 grams of tertiary-butyl hydroperoxide are added. The solution is cooled at said temperature. Thereafter, benzene is evaporated under vacuum, and a white crystalline mass, weighing 23 grams, is obtained. The product is dried under high vacuum at ambient 25°C. The adduct has a melting point of 70°–71°C. and decomposes at 155°C.

EXAMPLE 2

The preceding Example is reproduced using instead of tert-butyl hydroxide 80 percent pure cumene hydroperoxide, and the yield of the resulting product is about 100 percent.

EXAMPLE 3

Into a 100 milliliter, 3-neck flask, equipped with a mechanical stirrer, condenser, thermometer, argon inlet and an additional funnel there are placed 10.41 grams of the cumene hydroperoxide-triethyldiamine adduct described in Example 2 and 20 milliliters of dried benzene. The solution is cooled to about 10°C. and 10.86 grams of trimethylchlorosilane is added. An exothermic reaction occurs immediately to produce a white, crystalline material. The reaction is allowed to continue for one hour, and the white crystalline solid is filtered and dried to yield 4.3 grams of a material having a melting point of 316°–317°C., at which temperature it decomposes. The benzene solution is concentrated under vacuum to give a greenish, oily liquid in the yield of about 75 per cent, 8 grams. The liquid has a decomposition temperature of about 176°C. This peroxy silane from infrared analysis has the following formula:

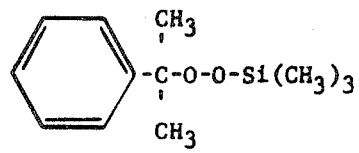

EXAMPLE 4

Into a 100 milliliter, 3-neck flask, equipped with a mechanical stirrer, addition funnel, condenser, thermometer and an argon inlet there are placed 17.52 grams of the adduct of tertiary butyl hydroperoxytriethylenediamine, as described in Example 1, and 70 milliliters of n-hexane. The slurry is cooled to 3°C. and a solution of 6.46 grams of vinyltrichlorosilane and 10 milliliters n-hexane is added. An exothermic reaction occurs immediately and produces a white solid in the reaction flask. The reaction is allowed to proceed for 40 minutes, and the amine hydrochloride salt (white solid) is filtered off, washed with normal hexane and is dried under vacuum. The hexane solution is concentrated to produce a colorless liquid which is dried with calcium oxide and charcoal to yield 10 grams of product having a decomposition temperature of 150°–155°C., characterized by the formula:

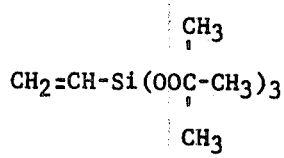

EXAMPLE 5

The process of Example 4 is repeated using allyltrichlorosilane instead of vinyltrichloride silane, and the resulting product has the formula:

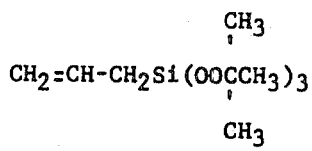

This product decomposes at about 174°–175°C. The yield of such product is about 98 percent, based upon the hydroperoxide employed.

EXAMPLE 6

The process of Example 2 is repeated except that the silane is gamma-methacryloxypropyltrichlorosilane and the resulting product has the following formula:

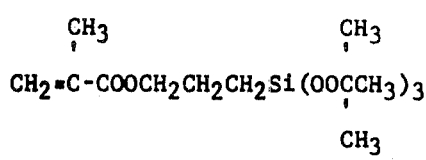

EXAMPLE 7

Employing the procedures of the preceding Example using a silane of the formula:

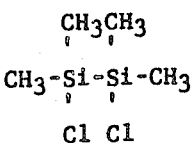

there is obtained a peroxy silane having the formula:

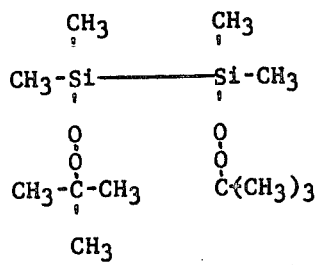

EXAMPLE 8

Using the procedures of the preceding Examples with the silane of the following formula:

and cumene hydroperoxide, there is obtained a silane having the following structure:

EXAMPLE 9

Employing the procedure of the preceding Examples and employing a chlorine end-blocked siloxane having the formula $((CH_3)_2SiO)_{10}Cl_2$, there is obtained, with tertiary-butylhydroperoxide the following product:

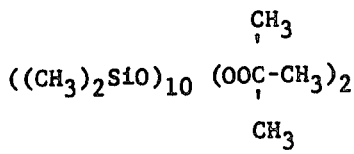

EXAMPLE 10

To a slurry containing 8.76 parts by weight of the adduct of triethylene diamine and tertiary-butylhydroperoxide of Example 1 and 50 parts by weight of n-hexane is added while cooling at approximately 3°C. a solution of 2.85 parts by weight of hexachlorodisiloxane and 10 parts by weight of n-hexane. An exothermic reaction occurs and the reaction is allowed to proceed for one hour, after which the insoluble triethylene diamine-HCl salt is removed by filtration. The filtrate is concentrated under vacuum to give a white crystalline mass which melts at 50°C. Analysis of the mass supports the expected structure:

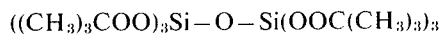

EXAMPLE 11

The procedure of Example 10 is repeated except chlorine treated fumed silica filler is employed and it is suspended in n-hexane. The fumed silica has been treated with thionyl chloride at 75°C. for two hours in a closed environment. Analysis of the resulting reaction product shows the presence of tertiary-butylhydroperoxide groups on the silica filler particles and the absence of chlorine.

Example 11 does not encompass the use of a solvent soluble silicon compound which forms a silicon peroxide which is similarly solvent soluble. In this embodiment, the silicon compound has such a high molecular weight and is of such a cross-linked nature that it is insoluble in the solvent. It has surface groups, which are substituted with chlorine which can be peroxidized by reaction with the amine-hydroperoxide adduct. In this embodiment the halo substituted silicon compound is suspended in the solvent and the resulting silicon peroxide is insoluble in the organic solvent and suspended therein. It is separated from the amine hydrohalide at a relatively low temperature by treatment with water or polar solvent which only dissolves the amine hydrohalide salt.

EXAMPLE 12

The process of Example 2 is repeated except that the chlorosilanes listed below are converted to the listed peroxysilanes:

CHLOROSILANE

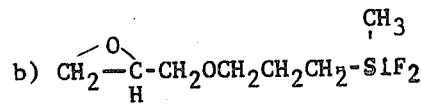

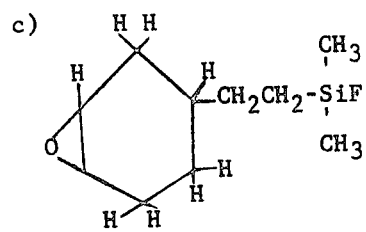

PEROXYSILANE

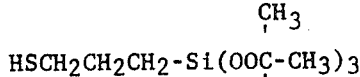

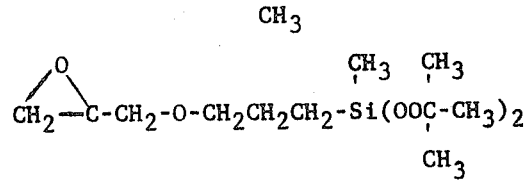

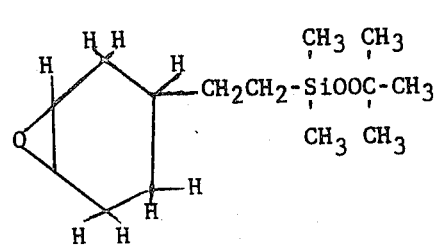

d) HSCH$_2$CH$_2$-SiCl$_3$    HSCH$_2$CH$_2$Si(OOC-CH$_3$)$_3$ (with CH$_3$ on the C of OOC)

e) CH$_2$=C(CH$_3$)—COO(CH$_2$)$_3$—SiCl$_2$(C$_6$H$_5$)

CH$_2$=C(CH$_3$)—COO(CH$_2$)$_3$—Si(C$_6$H$_5$)(OOC-CH$_3$)$_2$ (with CH$_3$ on OOC)

f) CH$_2$=C(CH$_3$)—COO(CH$_2$)$_3$—Si(CH$_3$)$_2$—Cl

CH$_2$=C(CH$_3$)—COO(CH$_2$)$_3$—Si(CH$_3$)$_2$(OOC-CH$_3$)

g) HSCH$_2$CH$_2$CH$_2$Si(CH$_3$)(CH$_2$CH$_3$)—Cl

HSCH$_2$CH$_2$CH$_2$Si(CH$_3$)(CH$_2$CH$_3$)—OOC—CH$_3$

EXAMPLE 13

Into a solution containing 1.4 parts by weight of Hexa* and 20 parts by weight of methanol is added at room temperature (25°C.) a solution of 3.60 parts of tertiary-butylhydroperoxide and 10 parts by weight of methanol. The solution is stirred for about 5 minutes. A white crystalline solid is obtained. After removing the methanol under vacuum, it decomposes gradually at 75°C. without melting. The yield of the solid is 53% based on the weight of hydroperoxide used.

*Hexamethylene tetramine

EXAMPLE 14

The procedure of the preceding example is repeated using a mole ratio of one mole of Hexa for each hydroperoxy group of the hydroperoxide, and in each case there is obtained good yields of the corresponding adduct of Hexa and the hydroperoxide:

cumene hydroperoxide
methyl hydroperoxide
hydrogen peroxide
2,5-dihydroperoxy-2,5-dimethylhexane
2,7-dihydroperoxy-2,7-dimethyloctane
2,3-dimethyl-3-hydroperoxybutene-1

EXAMPLE 15

Into a solvent slurry of the above Hexa and tertiarybutylhydroperoxide adduct there is added with stirring metal salt in the amount indicated in the table below. To the slurry is added with cooling (3°C.) and stirring vinyltrichlorosilane in the 33 amount indicated in the table below. The reaction is typically rapid and exothermic, and on completion thereof, the insoluble Hexa·HCl adduct and the metal salt are removed by filtration and discarded. The product is removed by distallation of the solvent solution and the yield, based on the percent of hydroperoxide employed, of product is indicated below.

| Moles of Vinyl trichloro-silane | Moles of Hexa* Adduct | Inorganic Salt, moles | | Solvent | % Yield |
|---|---|---|---|---|---|
| 0.11 | 0.50 | CaCl$_2$ granular, | .36 | Hexane | 80 |
| 0.07 | 0.24 | CaCl$_2$ powder, | .27 | Petroleum Ether | 80 |
| 0.07 | 0.25 | CaCl$_2$·2H$_2$O powder | .27 | Hexane | 93 |
| 0.13 | 0.50 | MgSO$_4$ powder, | .25 | Petroleum Ether | 83 |
| 0.06 | 0.25 | MgSO$_4$ powder, | .13 | Hexane | 64 |
| 0.07 | 0.24 | MgSO$_4$ powder, | .25 | Petroleum Ether | 73 |
| 0.07 | 0.25 | MgSO$_4$·7H$_2$O powder, | 0.27 | Hexane | 57 |
| 0.06 | 0.25 | CaSO$_4$ powder, | 0.22 | Petroleum Ether | 60 |

EXAMPLE 16

The procedure set forth in the preceding example is repeated with the following chlorosilicon compounds and Hexa-peroxide adducts in the mole ratios indicated. The metal salt employed is powdered calcium chloride added to the slurry in an amount 10 mole percent greater than the mole amount of adduct. The solvent is n-hexane. In each case the yield of the silyl peroxide compound indicated is better than 50 percent based upon the weight of peroxide employed.

EXAMPLE 17

To a solution of 8.06 grams of vinyltrichlorosilane and 150 grams of n-hexane are added, while cooling to 5°C. with stirring 5.4 grams of sodium methoxide. An exothermic reaction occurs, and after 10 minutes of stirring, 7.3 grams of the adduct of triethylene diamine and tertiary-butylhydroperoxide are added. The reaction is allowed to proceed for an additional 1½ hours, and the insoluble hydrochloride salt of triethylene diamine is removed by filtration. The filtrate is concentrated under vacuum to give a clear liquid containing a mixture of vinyldimethoxy(tertiary-butylperoxy) silane and vinyl bis(tertiary-butylperoxy)methoxy silane. The yield of the liquid is 78 percent based on the weight of hydroperoxide employed.

EXAMPLE 18

The process of example 17 is repeated except that instead of employing 8.06 grams of vinyltrichlorosilane, there are employed 8.75 grams of allyltrichlorosilane. The resulting product is a mixture of allyldimethoxy(tertiary-butylperoxy)silane and allylbis(tertiary-butylperoxy)methoxy silane.

EXAMPLE 19

Repeating the procedure of example 17, there are employed instead of 5.5 grams of sodium methanolate, 8.2 grams of sodium acetate. The resulting product is a mixture of vinyldiacetoxy(tertiary-butylperoxy)silane and vinyl bis(tertiarybutylperoxy)acetoxy silane.

Similar results are obtained when potassium phenate is substituted for the sodium acetate.

EXAMPLE 20

The vinyldimethoxy(tertiary-butylperoxy)silane, obtained by the vacuum distillation of the mixture of example 17, is hydrolyzed by adding 5 grams thereof to neutral (pH of 7) water and left there for 48 hours. Upon evaporation of the water under 1 millimeter mercury at 40°C., there is obtained vinyl(tertiary-butylperoxide)siloxane. The siloxane is soluble in toluene. After evaporation of the neutral water used to effect hydrolysis and condensation, the siloxane is not soluble in all proportions in water. This siloxane is capable of polymerizing styrene to a high molecular weight solid polymer by heating it together with styrene to 275°C.

EXAMPLE 21

Into a 100 milliliter, 3-neck flask, equipped with a mechanical stirrer, addition funnel, condenser, thermometer and an argon inlet there are placed 17.52 grams of the adduct of tertiary-butylhydroperoxy-triethylene diamine, as described in Example 1, and 70 milliliters of n-hexane. The slurry is cooled to 3°C. and a solution of 5.45 grams of trichlorosilane and 10 milliliters of n-hexane are added. An exothermic reaction occurs immediately and produces a white solid in the reaction flask. The reaction is allowed to proceed for 40 minutes, and the amine hydrochloride salt (white solid) is filtered off, washed with normal hexane and is dried under vacuum. The hexane solution is concentrated to produce a liquid having the formula:

$$HSi(OOC-CH_3)_3 \quad \text{with CH}_3 \text{ groups}$$

$$\text{HSi(OO}\overset{\underset{\displaystyle CH_3}{|}}{\underset{\displaystyle CH_3}{C}}\text{-CH}_3)_3$$

When the same mole amount of the triethylene diamine adduct of cumene hydroperoxide is substituted for the tertiary-butylhydroperoxy-triethylene diamine

| Silicon Compound | Moles of Silicon Compound | Hydroperoxide formed as adduct with Hexa | Moles of Adduct | Structure of Product |
|---|---|---|---|---|
| A.) $(SiO_2)_{15}Cl_{21}$* | 1 | cumene hydroperoxide | 25 | 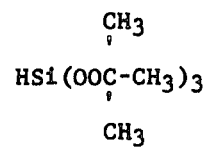 |
| B.) chlorinated fumed silica particles** | 1 | tert.-butylhydroperoxide | 10 | fumed silica containing tert.-butylperoxy groups |
| C.) gamma-methylacryloxypropyl-trichlorosilane | 1 | tert.-butylhydroperoxide | 3 | gamma-methylacryloxypropyl-tris(tert.-butylperoxy)-silane |
| D.) $CH_3SiCl_2H$ | 1 | cumene hydroperoxide | 2 | $CH_3SiH(OOC(CH_3)_2C_6H_5)_2$ |
| E.) gamma-isocyanatopropyl-trichlorosilane | 1 | tert.-butylhydroperoxide | 3 | $O=C=N(CH_2)_3Si(OOC(CH_3)_3)_3$ |
| F.) trimethyl-chlorosilane | 1 | 2,5-dihydroperoxy-2,5-dimethylhexane | 1 | 2,5-bis(trimethylsilylperoxy)-2,5-dimethylhexane |

*Partially hydrolyzed $Si(OC_2H_5)_4$ followed by treatment with thionyl chloride or acetylchloride.

**Formed by treated fumed silica at 75°C. with thionyl chloride. The particles are suspended in hexane and mixed with the adduct.

above in practicing the above example there is obtained the silane of the formula:

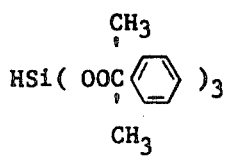

EXAMPLE 22

The process of Example 21 is repeated except instead of employing trichlorosilane, 4.1 grams of dichlorosilane are used and instead of the adduct of tertiary-butylhydroperoxy-triethylene diamine, there is employed two-thirds of the mole amount of the cumene hydroperoxide adduct of Example 2. The resulting product has the formula:

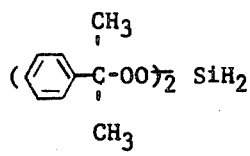

EXAMPLE 23

Repeating the procedures of Example 21, the following halosilanes are reacted with the hydroperoxide amine adducts listed to obtain the indicated peroxy silanes:

| Halosilane | Hydroperoxide amine adduct | Peroxy silane |
|---|---|---|
| $H_3SiBr$ | Hexa adduct of tert.-butylhydroperoxide | $H_3SiOOC(CH_3)_3$ |
| $H_3SiCl$ | Adduct of $HOOC(CH_2)_4COOH$ $\overset{CH_3}{\underset{CH_3}{\,}} \overset{CH_2}{\underset{CH_2}{\,}}$ and triethylene diamine | $H_3SiOOC(CH_2)_4COOSiH_3$ $\overset{CH_3}{\underset{CH_3}{\,}} \overset{CH_3}{\underset{CH_3}{\,}}$ |
| $H_2SiCl_2$ | Adduct of hydrogenperoxide and triethylene diamine | $H_2Si(OOH)_2$ |
| $H_2SiCl_2$ | Mixed adduct of $HOOC(CH_3)_2(CH_2)_4C(CH_3)_2OOH$ and tert.-butylhydroperoxide with triethylene diamine | $H_2Si\text{-}OOC(CH_2)_4C\text{-}OO\text{-}SiH_2$ with pendant $CH_3$ groups and $O\text{-}O\text{-}C(CH_3)_3$ groups |

EXAMPLE 24

To a solution of 6.75 grams of trichlorosilane and 150 grams of n-hexane are added, while cooling to 5°C. with stirring, 5.4 grams of sodium methoxide. An exothermic reaction occurs, and after 10 minutes of stirring, 7.3 grams of the adduct of triethylene diamine and tertiary-butylhydroperoxide are added. The reaction is allowed to proceed for an additional 1½ hours, and the insoluble hydrochloride salt of triethylene diamine is removed by filtration. The filtrate is concentrated under vacuum to give a clear liquid containing a mixture of dimethoxy(tertiary-butylperoxy) silane [$(CH_3O)_2((CH)_3COO)SiH$] and bis(tertiary-butylperoxy)methoxy silane [$(CH_3O)((CH_3)_3COO)_2SiH$]. The yield of the liquid is 76 percent based on the weight of hydroperoxide employed.

EXAMPLE 25

The process of Example 24 is repeated except that instead of employing 6.75 grams of trichlorosilane, there are employed 5.05 grams of dichlorosilane. The resulting product is methoxy(tertiary-butylperoxy)silane [$(CH_3O)((CH)_3COO)SiH_2$].

EXAMPLE 26

Repeating the procedure of Example 24, there are employed instead of 5.5 grams of sodium methoxide, 8.2 grams of sodium acetate. The resulting product is a mixture of diacetoxy(tertiary-butylperoxy)monohydrosilane and acetoxy bis(tertiary-butylperoxy)-monohydrosilane.

Similar results are obtained when potassium phenate is substituted for the sodium acetate.

EXAMPLE 27

The dimethoxy(tertiary-butylperoxy)silane, obtained by the vacuum distillation of the mixture of Example 24, is hydrolyzed by adding 5 grams thereof to neutral (pH of 7) water and left there for 48 hours. Upon evaporation of the water under 1 millimeter mercury at 40°C., there is obtained (tertiary-butylperoxide)hydrosiloxane. The siloxane is soluble in toluene. After evaporation of the neutral water used to effect hydrolysis and condensation, the siloxane is not soluble in all proportions in water. This siloxane is capable of polymerizing styrene to a high molecular weight solid polymer by heating it together with styrene to 275°C.

EXAMPLE 28

Laminates are prepared from 3-plies of heat cleaned 181 glass cloth and 4 plies of 20 millimeters thich polypropylene (melt index of 4) plaques. Silyl peroxides are applied from a 2 weight percent solution in n-hexane to the glass. Lamination is carried out at 200°C. and pressure is applied to 300 pounds per square inch gauge in a platen press. The resulting laminates contain about 40 to 45 percent by weight glass and are about 90 to 100 millimeters thick depending on the system. Their flexural properties are shown below:

| Silyl Peroxide Coupling Agent | Flexural Strength* PSI (25°C.) | Modulus of Elasticity* PSI (25°C.) |
| --- | --- | --- |
| Control | 13,500 | 700,000 |
| vinyltris(t-butylperoxy)silane | 22,400 | 907,000 |
| allyltris(t-butylperoxy)silane | 19,000 | 845,000 |

*A.S.T.M. D-790-66

EXAMPLE 29

Example 28 is repeated using 3-plies of glass mat* made of 5 inch chopped glass strand and the following data are obtained.

| Coupling Agent | Flexural Strength** PSI (25%) | Modulus of Elasticity PSI (25%) |
| --- | --- | --- |
| Control | 15,900 | 710,000 |
| vinyltris(t-butylperoxy)silane | 22,100 | 880,000 |

*made by PPG Industries, Pittsburgh, Pennsylvania, of PPG-50K-5 inches long chopped glass strand with binder coating 864; mat is bound with P-812 adhesive and is made on a preform machine; it weighs 1-1.5 oz/ft.²
**A.S.T.M. D-790-66

EXAMPLE 30

Example 28 is repeated except that the silyl peroxide is applied neat onto the surface of the polypropylene plaques and 2 weight percent is deposited, based on the weight of plaque. The resulting laminates contain about 20 percent by weight of glass and are about 125 millimeters thick. The flexural properties are shown below:

| Coupling Agent | Flexural Strength** PSI (25%) | Modulus of Elasticity** PSI (25%) |
| --- | --- | --- |
| Control | 7,630 | 298,000 |
| vinyltris(t-butylperoxy)silane | 12,900 | 545,000 |
| gamma-aminopropyl(triethoxy)silane | 8,990 | 400,000 |
| gamma-methacryloxypropyltrimethoxysilane and dicumyl peroxide* | 12,700 | 356,000 |

*dissolve equal parts by weight of gamma-methacryloxypropyltrimethoxysilane and dicumyl peroxide in a small amount of methanol and apply two weight per cent based on weight of glass. **A.S.T.M. D-790-66

EXAMPLE 31

In this example the following procedure is employed.

Allyl tris(tertiary-butylperoxy)silane is blended in particles of polypropylene injection molding resin (melt index of 4.5) having a size between 35 and 60 mesh. The amount of silane added is based on the weight percent of the resin employed. The percent of polymer in the eventual product is weight percent based on the total weight of the product. The silane is blended for five minutes on the powdered resin, then chopped fiber glass is added. The fiber glass is one-fourth inch in length chopped roving sold by Owens Corning Fiberglass Corp., Toledo, Ohio. It has a 0.0002 inch diameter per filament and contains 200 filaments per roving strand. The percent amount of fiber glass in the final product is based on the total weight of the final product. The mixture of fiber glass and treated polypropylene resin is molded in a screw injection extruder and the results obtained are characterized in the following table:

| Components | | | | | | | |
| --- | --- | --- | --- | --- | --- | --- | --- |
| Polypropylene wt% | 100% | 99 | 70 | 69.3 | 69.3 | 60 | 59.4 |
| Silyl Peroxide wt% | — | 1 | — | 0.7 | 0.7 | — | 0.6 |
| Fiber Glass wt% | — | — | 30 | 30.0 | 30.0 | 40 | 40.0 |
| Flex. Str. psi ASTM D-790 | | 5100 | 10,600 | 12,200 | 12,000 | 8,600 | 12,000 |
| Heat Dist. 264psi°C ASTM D-648 | 61 | 64 | 114 | 152 | 148 | 107 | 147 |

EXAMPLE 32

Example 31 is repeated except that the silyl peroxides are applied either on the glass fiber as finishes or on the polypropylene as integral blends. The physical properties and the surface appearance of glass fiber filled injection molded paprts containing silyl peroxide are superior to unmodified glass fiber filled parts.

| Coupling Agent | Method and amount of silyl peroxide applied, weight percent | Heat Distortion Temp. ASTMD-648 264 PSI, °C. | Flexural Strength ASTM D-790 PSI(R.T.) |
| --- | --- | --- | --- |
| Control | | 114 | 10,600 |
| vinyltris(t-butyl-peroxy)silane | on resin (0.7%) | 154.5 | 14,700 |
| do. | on glass (0.3%) | 153.6 | 12,800 |
| allyltris(t-butylperoxy)silane | on resin (0.7%) | 155.8 | 15,200 |
| do. | on glass (0.3%) | 157.4 | 12,900 |

EXAMPLE 33

Repeating Example 32, the silyl peroxide is applied on the glass fiber from a petroleum ether solution. Physical properties of glass filled injection molded parts into which silyl peroxide are added are superior to unmodified glass fiber filled parts.

| Coupling Agent | Method | Heat Distortion Temp. 264 PSI, °C. | Flexural Strength PSI (R.T.) |
|---|---|---|---|
| Control | | 93 | 7,300 |
| Tetrakis(t-butylperoxy)silane | on glass fiber (0.15%) | 116 | 8,650 |

EXAMPLE 34

The silyl peroxide is applied on resin grade asbestos [(UCC RG-244) sold by Union Carbide Corporation, New York, N.Y.] from a 2 weight percent n-hexane solution before mixing with high density polyethylene (density of 0.960 and melt index of 5). Mixing is accomplished with a two roll mill operating at temperatures between 285 and 300°F. About one (1) weight percent peroxide, based on weight of resin is applied on the asbestos. The composite containing 30 percent by weight of the asbestos is then compression molded in a platen into a 75 millimeter thick plaque at 365°F. under an initial pressure of 75 pounds per square inch gauge and an ultimate pressure of 1,000 pounds per square inch gauge during a 10 minute period. Flexural properties measured at 25°C. and at 160°F. are shown in the following:

| Coupling Agent | Flexural Strength PSI* 25°C. | 160°F. | Modulus of Elasticity* 25°C. | 160°F. |
|---|---|---|---|---|
| Control | 7,830 | 5,360 | 487,000 | 296,000 |
| vinyltris(t-butylperoxy)silane | 10,100 | 5,580 | 546,000 | 347,000 |

*A.S.T.M. D-790

The following methods are employed in subsequent examples to demonstrate the adhesion of a variety of surfaces which, without the employment of the silyl peroxide, would have essentially no or little adhesion.

Method A:

To particles of the resin indicated below there is incorporated 2 weight percent of the silyl peroxide as indicated in the tables below. This is accomplished by soaking particles of the resin in a solution of the silyl peroxide in n-hexane followed by evaporation of the solvent. Evaporation is effected below the decomposition temperataure of the silyl peroxide. The resin is then pressed at a temperature between 110°C. and about 130°C. to produce a 30 mils thick sheet. The sheet is then laminated in a platen press to another surface, as indicated below, at the conditions described in the tables below.

Method B:

In this method, the resin is formed into the aforedescribed sheet and the silyl peroxide, as indicated below, is spread neat on a surface of the sheet. The amount of silyl peroxide so applied is usually around 1.8 milligrams per square inch of sheet surface. The sheet is then laminated with substrates described below in a platen press employing the conditions specified in the tables.

In each of the examples, the adhesion between the surfaces is examined and the results are characterized in terms of peeling strength.

TABLE I

BONDING THERMOPLASTIC RESIN TO ORDINARY ¼" PLATE GLASS WITH VINYLTRIS(TERT-BUTYLPEROXY)SILANE

| Example No. | Thermoplastic Resin | Method | Bonding Conditions Temperature °C. | Time Minutes | Peeling Strength lbs/inch | Remarks |
|---|---|---|---|---|---|---|
| 35 | Low density polyethylene (density 0.917) | A | 160 | 5 | >40 | polymer rupture |
| 36 | polystyrene (molding grade) | B | 170 | 10 | strong bond | glass rupture |
| 37 | polycarbonate* | B | 185 | 3 | do. | do. |
| 38 | polycarbonate* | B | 150 | 10 | do. | do. |
| 39 | terpolymer of 34% acrylonitrile 8% 1,3-butadiene and 68% styrene | B | 185 | 5 | do. | polymer rupture |
| 40 | polyvinylchloride[1] | B | 140 | 5 | 24 | do. |
| 41 | polysulfone[2] (melt index of 5) | B | 220 | 5 | strong bond | glass rupture |
| 42 | High density polyethylene (density 0.96; melt index of 5) | A | 160 | 5 | do. | polymer rupture |
| 43 | polypropylene (melt index of 4) | B | 160 | 5 | 21 | |
| 44 | ethylene-vinyl acetate copolymer (18% vinyl acetate; melt index of 2.5) | B | 130 | 10 | strong bond | polymer rupture |

TABLE I — Continued

BONDING THERMOPLASTIC RESIN TO ORDINARY ¼" PLATE GLASS WITH VINYLTRIS(TERT-BUTYLPEROXY)SILANE

| Example No. | Thermoplastic Resin | Method | Bonding Conditions Temperature °C. | Time Minutes | Peeling Strength lbs/inch | Remarks |
|---|---|---|---|---|---|---|
| 45 | ethylene-vinyl acetate copolymer (28% vinyl acetate; melt index of 20) | B | 130 | 10 | strong polymer bond | rupture |

*poly-1,3(2,2,4,4-tetramethyl)cyclobutylene carbonate
[1] Specific gravity of 1.38; tensile strength (ASTM D 882) of 8500; percent elongation of 95 (ASTM D 882).
[2] condensation copolymer depicted

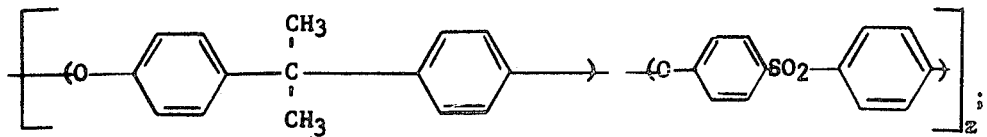

z equals a melt index of 5.

z equals a melt index of 5.

The following table demonstrates the bonding of low density polyethylene resin (density 0.917) sheet to ¼ inch plate glass with a variety of peroxy silanes.

TABLE II

| Examples No. | Silyl Peroxide | Method | Bonding Conditions Temperature °C. | Time Minutes | Peeling Strength- lbs/inch | Remark |
|---|---|---|---|---|---|---|
| 46 | vinyltris(t-butylperoxy)silane | B | 160 | 5 | >40 | polymer ruptures |
| 46a | vinylmethylbis(t-butylperoxy)silane | A | 210 | 2 | 40 | polymer rupture |
| 46b | Hexa(t-butyl-peroxy(disiloxane | A | 210 | 5 | 32 | |
| 46c | Tris(t-butyl-peroxy)silane | B | 210 | 5 | >32 | |
| 46d | α-methacryloxy propyltris(t-butylperoxy)silane | B | 210 | 5 | 24 | |
| 46e | vinyldimethoxy(t-butylperoxy)silane | B | 210 | 5 | 25 | |
| 46f | Isocyanatopropyl tris(t-butyl-peroxy)silane | B | 210 | 5 | 40 | polymer ruptures |

TABLE III

[The examples in this table demonstrate bonding of dissimilar and incompatible resin film (sheets) using peroxysilanes and siloxanes]

| Ex. No. | First resin film | Second resin film | Method | Bonding condition T°C. | tMin. | Peeling strength, lbs./in. | Silyl peroxide employed |
|---|---|---|---|---|---|---|---|
| 47 | Polyvinylchloride.[1] | Polyethylene [5] | B | 160 | 5 | 20 | Vinyltris(t.-butylperoxy)silane. |
| 48 | do [1] | Polypropylene [6] | B | 160 | 5 | 8 | Do. |
| 49 | Polysulfone [2] | Polyethylene [5] | B | 185 | 5 | 40 | Allyltris(t.-butylperoxy)silane. |
| 50 | ABS [3] | do. [5] | B | 210 | 5 | 4 | Do. |
| 51 | Polycarbonate [4] | Poly(dimethylsiloxane) rubber | B | 140 | 5 | ([9]) | Vinyltris(t.-butylperoxy)silane. |
| 52 | do. [4] | Ethylene-vinyl acetate copolymer [7] | B | 130 | 10 | ([9]) | Do. |
| 53 | Polyethyleneterephthalate | Polyethylene [5] | B | 185 | 15 | ([9]) | Allyltris(t.-butylperoxy)silane. |
| 54 | Polystyrene | do. [5] | B | 160 | 5 | 4 | Vinyltris(t.-butylperoxy)silane. |
| 55 | Polyhexamethyleneadipamide | do. [5] | B | 185 | 5 | 8 | Allyltris(t.-butylperoxy)silane. |
| 56 | Cellophane | do. [5] | B | 185 | 5 | ([9]) | Vinyltris(t.-butylperoxy)silane. |
| 57 | Polyethyleneterephthalate | Ethylene-vinyl acetate copolymers [8] | B | 165 | 5 | ([9]) | Do. |
| 58 | do | Polyethylene [5] | A | 185 | 15 | ([9]) | Allyl(t.-butylperoxy)tetrasiloxane. |

[1] Specific gravity of 1.38; tensile strength (ASTM D 882) of 8500; percent elongation of 95 (ASTM D 882).
[2] Condensation copolymer depicted:

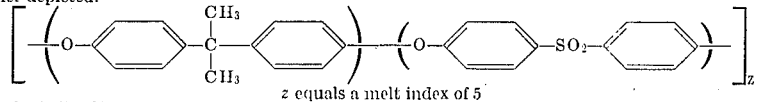

z equals a melt index of 5

[3] Terpolymer of 24% acrylonitrile 8% 1,3-butadiene and 68% styrene.
[4] Poly-1,3(2,2,4,4-tetramethyl)cyclobutylene carbonate.
[5] Low density polyethylene (density 0.917).
[6] Polypropylene (melt index of 4).
[7] Ethylene-vinyl acetate copolymer (18% vinyl acetate; melt index of 2.5).
[8] Ethylene-vinyl acetate copolymer (28% vinyl acetate; melt index of 20).
[9] Cohesive failure.

TABLE IV

These examples demonstrate bonding low density polyethylene (density 0.917) to 25 mil thick aluminum sheet

| Example No | Silyl Peroxide or other bonding aid | Method | Bonding Condition T°C. | time Min. | Peeling Strength lbs/in | Remark |
|---|---|---|---|---|---|---|
| 59 | Vinyltris(t-butylperoxy)silane | A | 220 | 5 | 68 | Polymer rupture |
| 60 | Vinyltris(t-butylperoxy)silane | B | 185 | 5 | 45 | |
| 61 | Vinyltris(t-butylperoxy)silane | B | 185 | 5 | 45 | after dipped in boiling water for two hours |
| 62 | Allytris(t-butylperoxy)silane | A | 220 | 5 | 78 | polymer rupture |
| 63 | Vinylmethylbis(t-butylperoxy)silane | A | 220 | 3 | 32 | |
| 64 | Vinylmethylbis(α,α dimethylbenzylperoxy)-silane | A | 220 | 3 | 31 | |
| 65 | Vinyltris(α,α dimethylbenzylperoxy)silane | A | 220 | 5 | 31 | |
| 66 | Allylmethylbis(t-butylperoxy(silane | A | 220 | 4 | 16 | |
| 67 | Tetrakis(t-butylperoxy)silane | A | 220 | 3 | 36 | |
| 68 | Methyltris(t-butylperoxy)silane | A | 220 | 3 | 31 | |
| 69 | Dimethylbis(t-butylperoxy)silane | A | 220 | 3 | 6.5 | |
| 70 | Dicumyl peroxide | A | 220 | 3 | 1 | |
| 71 | Control | A | 220 | 3 | 1.3 | |
| 72 | Vinyltrimethoxysilane | A | 160 | 5 | 7 | |
| 73 | α-Methylacryloxypropyltris(t-butylperoxy)-silane | B | 210 | 5 | 30 | |
| 74 | Vinyldimethoxy(t-butylperoxy)silane | B | 210 | 5 | 25 | |
| 75 | Isocyanatopropyltris(t-butylperoxy)silane | B | 210 | 5 | 25 | |
| 76 | Tris(t-butylperoxy)silane | B | 210 | 5 | 18 | |
| 77 | Hexa(t-butylperoxy)silane | B | 210 | 5 | 35 | |
| 78 | Allyl(t-butylperoxy)siloxane oligomer | A | 210 | 5 | 35 | |
| 79 | Vinyl(t-butylperoxy)siloxane oligomer | A | 185 | 5 | 30 | |
| 80 | Vinyldiacetoxy(t-butylperoxy)silane | A | 185 | 5 | 20 | |

TABLE V

These examples demonstrate the effect that vinyltris(t.-butylperoxy)silane has on bonding the polymers indicated below to 25 mil thick aluminum sheet.

| Example No. | Polymers | Method | Bonding Condition T°C | tMin | Peeling Strength lbs/in | Remark |
|---|---|---|---|---|---|---|
| 81 | polyethylene (density 0.917) | A | 220 | 5 | 68 | polymer rupture |
| 82 | polyethylene (density 0.917) | A | 140 | 5 | 15 | |
| 83 | polypropylene (molding grade) | B | 160 | 5 | 10 | |
| 84 | polyethylene (density 0.96) | B | 160 | 5 | 28 | |
| 85 | polyethylene (density 0.917) | B | 185 | 5 | 45 | |
| 86 | ethylene-vinyl acetate copolymer (28% by weight vinyl acetate) | B | 160 | 5 | strong bond | polymer rupture |
| 87 | ABS terpolymer | B | 220 | 5 | 5 | |
| 88 | polyvinylchloride | B | 160 | 5 | 7 | |
| 89 | cured Dimethyl silicone rubber | B | 185 | 5 | strong bond | polymer rupture |

The following table demonstrates a number of examples of interbonding dissimilar substrates with peroxy silanes. In each case, a control example is described, that is, adhesion is attempted in the absence of peroxy silane. The two substrates are characterized as Substrate A and Substrate B. The Substrates A and B in the control examples are exactly the same as are employed in the examples preceding each control example where peroxy silane is employed.

TABLE VI

| Example No. | Substrate A | Substrate B | Coupling Agent | Method | Bonding Conditions T°C | tMin | Peeling Strength lbs/in | Remark |
|---|---|---|---|---|---|---|---|---|
| 90 | polyethylene | stainless steel | vinyltris(t-butylperoxy)-silane | B | 150 | 5 | 20 | |
| 91 | polyethylene | stainless steel | control | B | 150 | 5 | 3 | |
| 92 | polyethylene | copper | α-methacryloxypropyltris-(t-butylperoxy)silane | B | 210 | 5 | 10 | |
| 93 | polyethylene | copper | control | B | 210 | 5 | none | |
| 94 | polyethylene | carbon steel | vinylmethylbis(t-butylperoxy)-silane | A | 220 | 4 | 2 | |
| 95 | polyethylene | carbon steel | control | A | 220 | 4 | none | |
| 96 | polypropylene | cotton cloth | vinyltris(t-butylperoxy)-silane | B | 155 | 5 | >10 | excellent wet strength |
| 97 | polypropylene | cotton cloth | control | B | 155 | 5 | 10 | |
| 98 | plate glass | plate glass | vinyltris(t-butylperoxy)-silane | B | 160 | 10 | — | good bonding |
| 99 | plate glass | plate glass | control | B | 160 | 10 | —No | adhesion |
| 100 | aluminium | aluminium | vinyltris(t-butylperoxy)-silane | B | 160 | 10 | — | good bonding |
| 101 | aluminium | aluminium | control | B | 160 | 10 | — | No adhesion |
| 102 | polyethylene | plywood | vinyltris(t-butylperoxy)-silane | B | 160 | 5 | 8 | wood rupture |
| 103 | polyethylene | plywood | control | B | 160 | 5 | 2 | |

TABLE VI — Continued

| Example No. | Substrate A | Substrate B | Coupling Agent | Method | Bonding Conditions T°C | tMin | Peeling Strength lbs/in | Remark |
|---|---|---|---|---|---|---|---|---|
| 104 | polypropylene | plywood | vinyltris(t-butylperoxy)silane | B | 160 | 5 | 5 | wood rupture |
| 105 | polypropylene | plywood | control | B | 160 | 5 | none | |
| 106 | ethylene-vinyl acetate copolymers | plywood | vinyltris(t-butylperoxy)silane | B | 160 | 5 | 8 | wood rupture |
| 107 | ethylene-vinyl acetate copolymers | plywood | control | B | 160 | 5 | 3 | |
| 108 | polystyrene | glass | vinyltris(t-butylperoxy)silane | B | 170 | 10 | cohesive failure | glass ruputure |
| 109 | polystyrene | glass | control | B | 170 | 10 | none | |

EXAMPLE 110

The following rubber formulation is compounded on a 2-roll mill;

| Ingredients | Parts by weight |
|---|---|
| 95% cis-1,4-polybutadiene rubber | 50 |
| quartz sand (average diameter about 1 millimeter) | 40 |
| vinyltris(tertiary-butylperoxy)silane | 2 |

The rubber is milled on a 2-roll mill to form a sheet. A mix of the sand and the silane is milled in the sheet on the mill. The sheet is cut from the mill and cured at 160°C. for 20 minutes. The resulting sheet of cured rubber contains the quartz sand held tightly therein, and when the rubber sheet is aggressively rubbed by hand against metal, concrete and glass surfaces, the sand is not abraded out.

EXAMPLE 111

Example 110 is repeated except that the formulation is as follows:

| Ingredients | Parts by weight |
|---|---|
| 96% cis-1,4-polybutadiene rubber | 50 |
| quartz sand (average diameter about 1 millimeter) | 80 |
| vinyltri(tertiary-butylperoxy)silane | 2 |
| 2-mercaptobenzathiazol | 0.5 |
| sulfur | 1.0 |
| zinc oxide | 1.0 |

The resulting rubber sheet is somewhat brownish because of the sulfur cure. However, the sand is held tightly in the rubber even after severe abrasion by hand against a variety of surfaces, such as metal, concrete and glass.

When the preceding is repeated without adding vinyltris(tertiary-butylperoxy)silane, it is found that the sand at the surface of the sheet is not held in the rubber and falls out simply by shaking the sheet. Any degree of abrasion readily mills the sand particles from the rubber sheet.

EXAMPLE 112

In this example, there is employed a polyurethane elastomer sheet of Estane 5740X-1 made by Goodrich Rubber Company, Akron, O., which is believed to be made from a polyester of poly-1,4-butyleneadipate which is end-blocked with bis(isocyanatophenyl)methane to form a prepolymer which is chain extended with 1,4-butanediol. It has a specific gravity of 1.20. Using Method B, a sheet of this Estane is bonded to a substrate sheet of polypropylene and a substrate sheet of plate glass to form laminates. The peroxysilane is vinyltris(tertiary-butylperoxy)silane. Control laminates free of the peroxysilane are made. The bonding conditions are a temperature of 185°C. for 10 minutes. In the case of bonding to the polypropylene sheet, there is essentially little adhesion in the case of the control whereas cohesive failure is noted in the case where peroxysilane is employed. The adhesion is determined by taking peeling strength in pounds per inch. In the case of plate glass the adhesion of the polyurethane to the glass is almost two times as great in the case where the peroxysilane is employed as compared to the control, as determined in peeling strength in pounds per inch.

EXAMPLE 113

In this example a 5-mils thick polytetrafluoroethylene sheet, Teflon 1 (specific gravity 2.17), made by E. I. duPont de Nemours and Company, Wilmington, Del., is bonded to polyethylene using Method B at 280°C. for 15 minutes. The polyethylene has a density of 0.96. In one case allyltris(tertiary-butylperoxy)silane is employed. In the other case a controlled experiment is run. The adhesion between the polyethylene and Teflon using the peroxysilane is 500 percent better than the adhesion in the case of the control. The same experiments are run using a sheet of polypropylene where the conditions are 185°C. for 15 minutes, and the peroxysilane improves adhesion by 400 percent. Where the same method is employed using aluminum to bond to the polytetrafluoroethylene, and vinyltris(tertiary-butylperoxy)silane is employed, the control exhibits no adhesion at all, whereas the peroxysilane gives a measurably improved adhesion. In bonding to aluminum the conditions are 175°C. for 5 minutes. When the experiment is repeated with plate glass using allyltris(tertiary-butylperoxy)silane and conditions of 185°C. for 15 minutes, essentially the same results are obtained, that is, the control gives essentially no bonding, whereas the peroxysilane gives a measurable improvement in bonding.

EXAMPLE 114

The procedures of Example 113 are repeated with a fluorinated ethylene-propylene copolymer called Teflon 100-X (specific gravity 2.15) made by E. I. duPont de Nemours and Company, Wilmington, Del. The substrates are the same polyethylene and polypropylene and the peroxysilane in each case is allyltris(tertiary-butylperoxy)silane. The bonding conditions are 280°C. for 10 minutes, and in each case the peroxysilane gives measurably improved bonding over the corresponding controls which, in each case, demonstrate no bonding.

EXAMPLE 115

Performance of two silyl peroxides, namely, vinyltris (t-butylperoxy) silane (I) and γ-methacryloxypropyl-tris (t-butylperoxy) silane (II) is shown in Table VII and VIII.

Silyl peroxides used in this work were applied either on glass as a finish or in the resin as an integral blend. When used as a finish, the silyl peroxide was put on the glass (181 heat cleaned glass cloth) from a 2% (by volume) solution in dichloromethane followed by evaporating of the solvent at ambient temperature under atmospheric pressure. Twelve plies of the finished glass cloths were laid up, impregnated with the polyester resin[1] containing 2% by weight of a peroxide.[2] Curing was carried out in an electrically heated platen press to ⅛ inch stops for 50 minutes at 75°C., followed by 1 hour at 160°C.

When used as an integral blend, 2% by weight of the silyl peroxide was intimately mixed with the polyester resin[1] without the addition of another catalyst. Twelve plies of glass cloths (181 heat cleaned glass cloth) were impregnated with the above blend and were ready for curing.

[1] 70 weight percent polyester of maleic acid, phthalic anhydride, and a mixture of ethylene glycol and diethylene glycol and 30 weight percent styrene, having the following properties:

| | |
|---|---|
| Specific Gravity at 25°C. | 1.15 |
| Refractive Index at 25°C. | 1.55 |
| Viscosity, centipoises at 25°C. | 2630 |
| Acid Number (mg. of KOH/gms. of resin) | 33 |
| Barcol Hardness | 44 |
| Color APHA | 100 max. |
| Flash Point, °C. | 54.4 |

[2] A paste containing 50 weight percent benzoylperoxide and 50 weight percent tricresylphosphate. Curing was carried out in an electrically heated platen press to ⅛ inch stops for 50 minutes at 75°C, followed by 1 hour at 120°C.

Flexural strength determinations were conducted according to ASTM D-790-66. Glass contents were determined by the combustion technique customarily employed.

TABLE VII

EFFECTS OF SILYL PEROXIDE FINISHES ON THE FLEXURAL STRENGTHS OR 12-PLY GLASS REINFORCED POLYESTER LAMINATES

| Finish | Glass Content % by Wt. | Flexural Strength-psi Dry Room Temperature | 2 Hour Boil |
|---|---|---|---|
| Control | 61.7 | 65,300 | 44,700 |
| Vinyltris(tert.-butylperoxy)silane | 60.3 | 75,000 | 66,700 |
| γ-Methacryloxypropyl-tris(t-butylperoxy)silane | 66.7 | 73,900 | 63,500 |

TABLE VIII

FLEXURAL STRENGTHS OF 11-PLY POLYESTER LAMINATES CONTAINING SILYL PEROXIDES AS INTEGRAL BLENDS

| Glass Integral Blend | Content % by Wt. | Flexural Strength-psi Dry Room Temperature | 2 Hour Boil |
|---|---|---|---|
| Control | 61.7 | 65,300 | 44,700 |
| Vinyltris(tert.-butylperoxy)silane | 61.6 | 71,300 | 48,700 |
| γ-Methacryloxypropyl-tris (t-butylperoxy) silane | 59.6 | 73,100 | 66,000 |

The substrates may contain surfaces which have chemically bonded thereto the peroxy silyl radical. For example, one may treat glass or siliceous pigments or fillers with chlorine, such as by reaction with thionyl chloride to bond chlorine to surface silicon atoms. Such silicon atoms may be treated with an amine-hydroperoxide adduct, as described above to introduce peroxy silyl right at the surface of the substrate. Then the substrate can be incorporated into or contacted to another surface forming material and by decomposition of the peroxy radical, intimate bonding can by effected with such other surface. For example, such peroxy silica can be blended with synthetic rubber such as 1,3-butadiene-styrene copolymers and ethylene-propylene terpolymer rubbers well known in the art, as well as those previously described, and with heat curing, the silica can be better bonded to the rubber. Therefore, it is intended that the invention also encompass such embodiment and that the surface portion of such substrate constitutes the "silicon compounds" referred to herein. Thus, the peroxy group bonded to the silicon atom in the substrate surface constitutes the silicon compound referred to herein.

What is claimed is:
1. The method of interbonding solid surfaces which comprises providing a silicon peroxide comprising a peroxide radical bonded to silicon thereof through a peroxy oxygen, at the interface of said surfaces and decomposing such peroxide radical.

* * * * *

UNITED STATES PATENT OFFICE
CERTIFICATE OF CORRECTION

Patent No. 3,856,606   Dated December 24, 1974

Inventor(s) You Ling Fan and 2. Richard Gregg Shaw

It is certified that error appears in the above-identified patent and that said Letters Patent are hereby corrected as shown below:

Strength lbs/in" corresponding to Example 108, "cohensive" should read -- cohesive --.
Column 34, Table VIII, heading, line 4, "11 Ply Polyester" should read -- 12 Ply Polyester --.
Column 34, Table VIII, subheading "Glass Integral Blend" should read -- Integral Blend -- and
Column 34, Table VIII, subheading "Content % by Wt." should read -- Glass Content % by Wt. --.

Signed and sealed this 3rd day of June 1975.

(SEAL)
Attest:

RUTH C. MASON
Attesting Officer

C. MARSHALL DANN
Commissioner of Patents
and Trademarks